United States Patent
Marra et al.

(10) Patent No.: US 6,309,994 B1
(45) Date of Patent: Oct. 30, 2001

(54) FIBER REINFORCED COMPOSITE HAVING AN ALUMINUM PHOSPHATE BONDED MATRIX

(75) Inventors: Robert A. Marra, Penn Hills; Donald J. Bray, Export; G. Edward Graddy, Jr., Murrysville; Siba P. Ray, Plum Boro, all of PA (US)

(73) Assignee: Aluminum Company of America, Pittsburgh, PA (US)

( * ) Notice: Subject to any disclaimer, the term of this patent is extended or adjusted under 35 U.S.C. 154(b) by 0 days.

(21) Appl. No.: 07/393,299

(22) Filed: Aug. 14, 1989

(51) Int. Cl.[7] .............................. C04B 35/10; C04B 35/80
(52) U.S. Cl. ..................... 501/95.2; 501/100; 501/127; 428/294.7; 428/375; 428/378; 428/396
(58) Field of Search ................................. 501/35, 87, 89, 501/95, 97, 99, 100, 127, 95.2; 428/156, 236, 237, 294.7, 375, 378, 396

(56) References Cited

U.S. PATENT DOCUMENTS

| | | | |
|---|---|---|---|
| 3,730,744 | 5/1973 | Yavorsky et al. | 106/57 |
| 4,158,687 | 6/1979 | Yajima et al. | 264/60 |
| 4,358,500 | 11/1982 | George et al. | 428/246 |
| 4,440,865 | * 4/1984 | Salazar | 501/95 |
| 4,558,016 | * 12/1985 | Bronson et al. | 501/95 |
| 4,563,219 | 1/1986 | George et al. | 106/287.19 |
| 4,652,413 | 3/1987 | Tiegs | 264/66 |
| 4,726,980 | * 2/1988 | Ishikawa et al. | 428/212 |

* cited by examiner

Primary Examiner—Karl Group
Assistant Examiner—Chris Gallo

(57) ABSTRACT

A method of forming fiber reinforced aluminum phosphate bonded material having improved strength at elevated temperatures. The method comprises the steps of: (a) preparing a slurry by blending alumina and alumina phosphate solution, the slurry being substantially free of silica; (b) providing a fiber substrate; (c) infiltrating the solution into the fiber substrate; and (d) curing the infiltrated substrate to form a fiber reinforced aluminum phosphate bonded composite material. In a preferred embodiment of the present invention, the fiber substrate is made from SiC fibers.

35 Claims, No Drawings

FIBER REINFORCED COMPOSITE HAVING AN ALUMINUM PHOSPHATE BONDED MATRIX

TECHNICAL FIELD

The present invention relates to ceramic matrix composites having an aluminum phosphate bonded matrix. More particularly, the invention is directed to fiber reinforced aluminum phosphate bonded composites which exhibit high strength at temperatures up to approximately 1370° C.

BACKGROUND ART

Increasing demands in the aerospace industry are creating need for lightweight structural materials having increased strength-to-density and increased stiffness-to-density at high temperatures. As high temperature applications have exceeded 1200° C., increased attention has been directed to ceramics such as silicon carbide. However, the design problems associated with the brittle nature of ceramic materials and the difficulty of fabrication have presented severe obstacles.

Fiber-reinforced composite ceramic articles are receiving increasing interest in aerospace applications that require properties such as high chemical, wear and corrosion resistance and good structural integrity at high temperatures. Such reinforced ceramics are presently being considered as suitable structural materials for the fabrication of heat exchangers, turbocharger rotors, cylinders, bearings, and other components of heat engines. The incorporation of fiber reinforced ceramic matrix composites will permit heat engines run more efficiently at higher temperature than heretofore possible with similar components of metal.

Reinforcing ceramic oxides such as alumina ($Al_2O_3$) with silicon whiskers or fibers has produced some particularly useful fiber-reinforced composite ceramic materials. The function of the fibers in the matrix is to substantially increase the fracture toughness of the alumina and thereby inhibit deleterious crack formation and crack growth due to material fatigue.

U.S. Pat. No. 4,158,687 issued to Yajima et al discloses a technique for producing heat-resistant composite materials reinforced with continuous silicon carbide fibers. The composite material is formed by pressing and heating a powdery ceramic matrix having an average grain size of less than 100 microns and continuous silicon carbide fibers.

U.S. Pat. No. 4,358,500 issued to George et al discloses flame resistant insulating fabric compositions containing an inorganic bonding agent. The inorganic composition is prepared from a liquid bonding agent which is prepared from colloidal silica, monoaluminum phosphate (MAP) and aluminum chlorohydrate (ACH). The bonding agent is used on a porous fabric, such as fiberglass, to prepare fabric compositions that are flame and heat resistant and improved electrical insulating properties. U.S. Pat. No. 4,358,500 also discloses that a high temperature refractory coating may be formed by the addition of high temperature refractory material such as zirconium oxide powder (325 mesh) to the liquid bonding agent.

U.S. Pat. No. 3,730,744 issued to Yavorsky et al discloses an aluminum phosphate bonded refractory material suitable for use in casting refractory shapes and making a ceramic product. The composition contains aggregate ceramic particles which can be employed in the composition. Theses aggregate ceramic particles may include calcined clay, silicate aggregates, carbides silicates, nitrides, borides and some metal powders and grits. The aggregate ceramic particles are bonded together by an aluminum dihydrogen orthophosphate bonding solution which is prepared by the reaction of reactive aluminum orthophosphate $Al(PO_4)$, aluminum hydroxide or colloidal alumina with hot, concentrated phosphoric acid.

U.S. Pat. No. 4,440,865 issued to Salazar discloses refractory compositions based upon alumina or aluminum silicate which is chemically bound by aluminum phosphate. The composition is formed using both liquid aluminum phosphate and phosphoric acid to form a portion of the aluminum phosphate in situ.

U.S. Pat. No. 4,563,219 issued to George et al discloses an inorganic binder composition and refractory-binder coated fabric composition prepared therefrom. The inorganic binder solution employed in providing refractory coatings on fabric substrates is prepared from colloidal silica, monoaluminum phosphate (MAP) and aluminum chlorohydrate (ACH) and a catalyst of an alkyl tin halide. George discloses that the colloidal silica and water in the binder solution act as a moderator to delay the rapid exothermal chemical reaction that would normally occur when MAP is mixed with ACH.

U.S. Pat. No. 4,652,413 issued to Tiegs discloses a method for preparing silicon carbide whisker-reinforced alumina ceramic articles. The articles are formed by cold pressing a mixture of alumina powder and silicon carbide whiskers and then sintering at atmospheric pressure.

While silicon carbide reinforced ceramic composite materials have been shown to significantly increase the strength and fracture toughness over conventional ceramics, their strength, structural reliability and impact resistance have not met the demands of the high temperature applications for which they are being designed.

In addition to thermal performance problems, there are still problems that exists with the fabrication processes that are presently being used to make fiber reinforced ceramic matrix composites (CMC). Many of the current fabrication techniques are limited to the formation of fiber reinforced ceramic articles which possess relatively simple shapes and shallow thicknesses. For example, the hot pressing of ceramic particulate mixtures in die sets inhibits the fabrication of articles with relatively complex shapes such as turbocharger rotors, cylinders, bearings, and the like. In addition, the hot pressed ceramic reinforced composites require extensive machining and other finishing processes which considerably increase the expense of fabricating structural components of complex shapes.

Another fabrication technique that limits the shapes and thicknesses of fiber reinforced ceramic articles are those that utilize a binder solution containing a fugitive organic binder. The fugitive organic binder is used in the slurry matrix to improve the adhesion of the matrix to the fibers before sintering. The organic fugitive binders evolve gases that must be completely removed prior to sintering so that voids are not created in the sintered piece. As the cross sectional thickness of the piece increases, the time that the green ceramic article must remain in an oven at a low burn off temperature increases. In addition, as the size and cross sectional thickness of the article increases, the likelihood that the evolved gases will be trapped in the interior of the piece increases. Therefore, fabrication of pieces by techniques employing fugitive organic binders must employ an additional production step to insure the binders have burned off prior to sintering. This extra step may be quite lengthy and adds both labor costs and energy costs to the process.

Another disadvantage associated with above composite article manufacturing technique, which employs a fugitive organic binder, is that the organic fugitive binders can be a source of unwanted impurities in the resultant composite. The unwanted impurities often result in a lowering of the high temperature properties of the composite article.

Yet another disadvantage of current fabrication techniques is that the matrix does not uniformly surround the fibers. The nonuniformity of the green body results in a nonuniform sintered composite article which may contain voids. This problem can be alleviated to a certain extent by the use of binders solutions which carry ceramic particles further into the fabric (fibers) and into the interior of the article. However, often the fabric acts as a filter which removes ceramic particles from the binder solution. This results in the matrix having a composition which changes as one moves into the interior of the article. This problem of nonuniformity is further aggravated when forming complex and/or three-dimensional composite structures. The problems of nonuniformity can be overcome, however often the labor costs needed to insure compositional uniformity may make the cost of the final product uncompetitive.

Another problem associated with the use of the prior art fabrication techniques is that they involve the mixing of reactive chemicals. Thus for example, in U.S. Pat. No. 3,730,744 the ceramic particles are bonded together by an aluminum dihydrogen orthophosphate bonding solution which is prepared by the reaction of reactive aluminum orthophosphate $Al(PO_4)$, aluminum hydroxide or colloidal alumina with hot, concentrated phosphoric acid. In U.S. Pat. No. 4,440,865, the aluminum silicate which is chemically bound by an aluminum phosphate composition formed from liquid aluminum phosphate and phosphoric acid. In U.S. Pat. No. 4,563,219, the inorganic binder solution employed in providing refractory coatings on fabric substrates is prepared from colloidal silica, monoaluminum phosphate (MAP) and aluminum chlorohydrate (ACH) and a catalyst of an alkyl tin halide. U.S. Pat. No. 4,358,500 discloses that the colloidal silica and water in the binder solution act as a moderator to delay the rapid exothermal chemical reaction that would normally occur when MAP is mixed with ACH.

It would be advantageous, therefore, to provide a method of fabricating fiber-reinforced ceramic matrix composites which are fracture resistant at temperatures in excess of 1200° C. In addition, it would be advantageous to provide a process for economically forming fiber-reinforced ceramic matrix composite articles into relatively complex geometries and sizes.

The principal object of the present invention is to provide a composition for producing a fiber-reinforced aluminum phosphate matrix composite which is fracture resistant and toughened at temperatures up to approximately 1370° C.

Another object of the present invention is to provide a method of producing a fiber-reinforced aluminum phosphate matrix composite, which is fracture resistant and toughened at temperatures up to approximately 1370° C., that does not involve processing at high temperatures and pressures. These conditions lead to mechanical and chemical damage of the fiber and unfavorable reactions between the fiber and matrix material.

Still another object of the present invention is to provide a low-cost process for producing a fiber-reinforced aluminum phosphate matrix composite that does not require mixing reactive chemicals such as aluminum hydroxide and hot, concentrated phosphoric acid.

A further object of the present invention is to provide a low-cost process for producing a fiber-reinforced aluminum phosphate matrix composite that does not require the addition of colloidal silica in the binder solution to act as a moderator to delay the rapid exothermal chemical reaction that might otherwise occur when using monoaluminum phosphate (MAP) and a reactive chemical like ACH.

Yet another object of the present invention is to provide a low-cost process for producing a fiber-reinforced aluminum phosphate matrix composite that does not require the addition of contaminating fugitive organic binders, which may produce impurities, to improve the adhesion of the matrix to the fibers before sintering.

Another object of the present invention is to provide a process for economically forming fiber-reinforced ceramic matrix composite articles into relatively complex geometries and sizes.

Another object of the present invention is to provide a method of manufacturing fiber-reinforced ceramic matrix composite articles which is less complex, less labor- and energy-intensive and allows for easier production of complex composite articles.

These and other objects and advantages will be more fully understood and appreciated with reference to the following description.

SUMMARY OF THE INVENTION

The present invention discloses a method of forming fiber reinforced aluminum phosphate bonded material having improved strength at elevated temperatures. The method comprises the steps of: (a) providing a fiber substrate; (b) providing a slurry prepared by blending alumina and alumina phosphate solution, the slurry being substantially free of silica; (c) infiltrating the solution into the fiber substrate; and (d) curing the infiltrated substrate to form a fiber reinforced aluminum phosphate bonded composite material. In a preferred embodiment of the present invention, the fiber substrate is made from SiC fibers.

Another aspect of this invention is the formation of a fiber-reinforced aluminum phosphate bonded refractory material having improved strength at temperatures up to approximately 1370° C., the method comprising the steps of: (a) providing refractory fiber; (b) providing a slurry prepared by blending alumina and alumina phosphate solution, the slurry being substantially free of silica; (c) impregnating the refractory fiber with slurry; and (d) drying and curing the impregnated refractory fiber to form a fiber reinforced aluminum phosphate bonded material. In a preferred embodiment of this aspect of the present invention, the refractory fibers are SiC fibers.

Yet another aspect of the present invention is the formation of a fiber reinforced aluminum phosphate bonded refractory material having improved strength at elevated temperatures, the refractory material comprising: refractory fiber; a matrix formed from a slurry prepared by blending alumina and alumina phosphate solution. The slurry is preferably substantially free of silica.

In a second embodiment of the present invention, the fiber reinforced aluminum phosphate bonded refractory composite material is prepared using: (a) $Al_2O_3$ filler; (b) $CrO_3$ to further improve high temperature performance; and (c) commercially available aluminum phosphate solutions instead of reactive chemicals such as mixtures of phosphoric acid and aluminum hydroxide.

Other features and advantages of the present invention will be apparent from the specification and claims.

DISCLOSURE OF THE INVENTION

As generally described above, the present invention is related to alumina phosphate compositions for reinforcing ceramic fibers. The aluminum phosphate composite material, which is used in forming the matrix of the composite material of the present invention, is formed from a monoaluminum phosphate (MAP) solution and does not require the mixing of reactive chemicals such as aluminum hydroxide and hot, concentrated phosphoric acid. In addition, components made from ceramic reinforced aluminum phosphate material can be formed and processed at temperatures which do not cause chemical damage to the fibers and unfavorable reactions between the fibers and the matrix material. The ceramic reinforced aluminum phosphate material of the present invention can be fabricated into articles of relatively complex shapes with a residual porosity of less than approximately 20%.

The reinforced composite material of the present invention is composed of three constituents; namely the fiber, the matrix and the interphase region. The fiber itself plays a major role in the ultimate properties of the composite. It is the principal load bearing constituent of the composite. In addition, the fiber serves to restrain crack propagation, to impart stiffness to the matrix, and to lower the overall density of the composite if the fiber density is less than the density of the matrix material.

The preferred amount of fiber for use in the present invention is between about 25 to about 75 wt. %. Since the density of the fibers is close to the density of the matrix material, the wt. % of the fibers in the composite will be approximately equal to the vol. % of the fibers. As will be discussed in greater detail below, the fibers are woven to a substrate or preform and the substrate is impregnated with a slurry of the matrix material. However, fibers can also be added to the slurry.

The preferred fibers for use in the present invention are silicon carbide (SiC) fibers. Nicalon SiC fibers have been found useful in practicing the present invention. Nicalon SiC fibers are commercially available from Nippon Carbon Company and distributed by Dow Corning Inc. Nicalon fibers are continuous fibers of beta silicon carbide ($\beta$.SiC) crystallites randomly arranged in an amorphous matrix containing both excess $SiO_2$ and free carbon.

The matrix material also plays a major role in the ultimate properties of the composite. The matrix material transfers and distributes the loads to the fibers. The matrix also serves to bind the fibers together and keep them spaced apart. The matrix may also serve as a crack arrestor. In addition, the matrix protects the fibers from the atmosphere.

The matrix material for use in the present invention is formed from an aluminum phosphate and very fine particulate alumina. The term aluminum phosphate is meant to include $AlPO_4$, $Al_2O_3$—$H_3PO_4$ and $Al(H_2PO_4)_3$ and other hydrated and anhydrous phases of aluminum phosphate. The two basic MAP phases for use in the present invention are $Al_2O_3$—$H_3PO_4$ and $Al(OH)_3$—$H_3PO_4$. Reactions between these phases are very complex and involve many intermediate steps. More than fifty aluminum phosphate phases have been identified and only a few of these have good bonding characteristics. The preferred matrix material for use in the present invention is an anhydrous aluminum phosphate and the most preferred matrix material is $AlPO_4$.

Another important aspect of the present invention is that the aluminum phosphate matrix material is substantially free of silica ($SiO_2$). The term "substantially free of silica" is used herein to mean below approximately 7 wt. % silica. $SiO_2$ and $H_3PO_4$ do not normally react at ambient temperatures. However, at higher temperatures (above 300° C.), they react to form $SiO_2.P_2O_5$ and $2SiO_2.P_2O_5$ phases. These silicon phosphate phases have low liquidus temperatures (1000 to 1200° C.) and will therefore lower the hot modulus of rupture (hot MOR) of the matrix material. To minimize the effect of these silicon phosphate phases, it is desirable to keep the wt. % of silica below approximately 7 wt. % silica. The preferred wt. % of silica is below about 5 wt. % and the most preferred wt. % is below 1 wt. %.

Although no reaction has been observed in the SiC—$H_3PO_4$ system at ambient temperatures, a reaction in the range of approximately 800° C. to 1200° C. occurs. This reaction may be associated with the formation of the silicon phosphate phases. Again, these low melting silicon phosphate phases will limit the high temperature performance of ceramic matrix composite. Therefore, the inventors do not recommend $SiO_2$ as a filler in the alumina phosphate bonded systems of the present invention.

Alumina ($Al_2O_3$) filler material, which is substantially free of $SiO_2$, has been found to be useful in forming matrix compositions which possess better high temperature properties than those that contain silica. $Al_2O_3$ and $H_3PO_4$ do not react to form low temperature melting phases.

The type of alumina used in the matrix is very important in determining the aluminum phosphate bond phases that will develop. Active aluminas such as hydrates, transition phases (i.e. gamma $Al_2O_3$), react with $H_3PO_4$ rapidly to form secondary and tertiary phosphates which have poor bonding characteristics. High surface area calcined alumina reacts with aluminum phosphate solutions or phosphoric acid to form phases that are easily converted to crystalline $AlPO_4$ phases which have good high temperature stability. The term "high surface area alumina" is used herein to mean alumina that has a surface area greater than approximately 10 $m^2/g$ and preferably greater than 100 $m^2/g$. Less active aluminas such as low surface area calcined alumina (alumina having a surface area of less than approximately 10 $m^2/g$), sintered or tabular alumina, or fused alumina produce amorphous phases with good bonding characteristics but lack high temperature thermal stability. The preferred alumina for use in the present invention are high surface area calcined aluminas.

The amount of alumina material in the matrix has also been determined to be important for maintaining strength at elevated temperatures. Good high temperature strength has been found using a slurry containing from about 10–70 wt. % of a high surface area alumina in a monophosphate solution. A preferred slurry for use in the present invention contains 33 wt. % high surface area alumina in 67 wt. % MAP. The amount of aluminum in the preferred slurry on an aluminum phosphate basis is 50 wt. %.

The third constituent of the reinforced composite material of the present invention is the interphase region. The interphase region is sometimes referred to as the fiber coating and it may be either a coating that is applied to the fiber as a processing step or a coating that forms during the processing, usually heat treatment, of the material. The interphase region controls the wetting and bonding of the fiber and matrix. The interphase region also protects the fiber from mechanical damage, serves as a diffusion barrier, controls fiber spacing and volume fraction, prevents fiber-fiber contact and transfers stresses from the matrix to the fiber.

Fiber coatings are not needed to practice the present invention. However, fiber coatings have been found to be useful in optimizing the high temperature properties of the composite material of the present invention. Silicone is a material that has been successfully used in practicing the present invention.

Returning to the matrix material, the addition of chromic acid to aluminum phosphate matrix material, which is by an amorphous $Al(PO_3)_3$ phase, has been found to increase the hot strength and extend the maximum use temperature of the material. The enhancement in strength stability is related to the higher temperature retention of the amorphous bonding phase in the $Al_2O_3$—$Cr_2O_3$—$P_2O_5$ systems. Chromic acid additions have also been found to facilitate the growth of stable phases which do not undergo the crystallographic inversions observed in $AlPO_4$.

EXAMPLE 1

(Prior Art)

Aluminum phosphate ceramic matrix composite article containing silicon carbon fibers utilizing the present method was prepared as follows:

Fiber Preparation:

A fabric panel approximately 100×100 cm was prepared from woven Nicalon silicon carbide fiber from Dow Corning. The fabric panel was woven in a plain weave having 16×16 tows per inch and an areal density of 0.176 g/in². The total weight of the fabric panel was 273 grams. The fabric panel was heat cleaned to remove the fabric sizing and any contaminating impurities from their surface.

Matrix Preparation:

A mixture of 29.3 wt. % Alcoa Hydral H-710B aluminum trihydrate ($Al(OH)_3$), 40.6 wt. % phosphoric acid, 5.6 wt. % deionized water, and 24 wt. % −325 mesh fused silica was prepared. This was accomplished by first weighing and blending 65.1 grams of Alcoa Hydral H-710B aluminum trihydrate, 108 grams of phosphoric acid, 15 grams of deionized water, and 65.1 grams of −325 mesh fused silica. The "powder" components were blended together by "tumbling" in a jar and cutting on paper or by using a V-blender.

The powder mixture was then slowly poured into a beaker containing the "liquid" components. A polyethylene stirrer was used to homogenize the resulting matrix slurry. The beaker was set in an ice bath to control heat of reaction.

Cloth Impregnation:

Slightly more than one-half of the matrix slurry was poured onto the cloth panel. The matrix slurry was then worked into the fabric with a squeegee until a uniform coating was achieved. The cloth was then turned over and the remaining matrix slurry was applied uniformly to the second side using the same technique as was used with the first side.

The impregnated cloth was then cut into nine composite-sized segments by laying out sections with a "straightedge" and cutting the cloth with large shears. The sizes of the nine composite-sized segments were approximately 40.6×15 cm (16×6 in).

Lay-up Composite Panel:

The composite-sized segments were placed on a ¹⁄₁₆-inch aluminum sheet. The aluminum sheet was slightly larger than the desired composite-sized segments and served as a base plate. Before placing the first composite-sized segment on the base plate, the bas e plate was first covered with a sheet of polyethylene terephthalate and then a piece of non-porous fluorocarbon coated fiberglass cloth.

The first composite-sized segment is then placed on the fiberglass coated cloth which covers base plate. The fabric is checked for voids and additional matrix is squeezed into the fabric to fill any voids. The process is repeated with each of the nine segments, one on top of the other, until all of the layers are in place.

The following bleeder plies are then placed on top of the "raw" composite stack:
  two pieces of porous fluorocarbon coated fiberglass cloth
  two pieces of silicone coated fiberglass cloth
  three pieces of fiberglass cloth
  a sheet of polyethylene terephthalate material.

Lamination:

The "raw" composite stack was then compacted in a heated laminating press. This was accomplished by heating slowly to 177° C. (350° F.) with 100 psi pressure. The exact procedure used is as follows:
  Place lay-up stack in press and apply 20 psi.
  Initiate heating to 88° C.
  Increase pressure at regular intervals until pressure is 100 psi.
  Amount of pressure and time increments depend on "setting" characteristics of the matrix at 88° C. (i.e., if a sample of matrix material sets after 30 minutes at 88° C., full pressure should be applied to a composite before 30 minutes have elapsed in the laminating cycle).
  After 1 hr. at 88° C., raise temperature to 104° C. and hold for 1 hr.
  Raise temperature to 132° C. and hold for 1 hr.
  Raise temperature to 177° C. and hold for 1 hr.

If there is excessive liquid bleed-out during the pressure lamination cycle, more "bleeder plies" can be added to the lay-up stack, both above and below the "raw" composite-sized segments of cloth. Excessive bleed-out can cause gas bubbles to become entrapped in the composite. These gas bubbles are undesirable in that they result in voids in the final product.

Oven Cure:

The stack is then removed from the press and the "bleeder" plies are striped off. The composite is placed in a drying oven preheated to 177° C. The temperature is ramped to 371° C. and held for 1 hr. The oven temperature is then ramped dow n to ambient temperature.

When the stack containing the $Al(OH)_3$—$H_3PO_4$ mixture was heated above 150° C., bloating and voids in the matrix were observed. This bloating was attributed to the reaction which produces $Al(H_2PO_4)_3$ and the associated liberation of $H_2O$ vapor.

Testing:

After cooling, samples were cut into strips with a water-cooled diamond saw to dimensions of 2.5 cm (1 in) wide and approximately 35.5 cm (15 in) long for tensile testing. Two specimens from each panel were tensile tested at 1100° C. and 1400° C. The average of the two samples was determined and the results are recorded on Table 1.

EXAMPLE 2

The procedure outlined in Example 1 was repeated in Example 2 except that a.) the 24 wt. % −325 mesh fused silica filler was replaced with 48 wt. % T-64 alumina which is commercially available from Alcoa (Aluminum Company of America) and b.) the $Al(OH)_3$—$H_3PO_4$ mixture was replaced with MAP. MAP is an aqueous solution containing approximately 50 wt. % $Al(H_2PO_4)_3$ (monoaluminum phosphate). The solution used contained 7.8–8.2 wt. % $Al_2O_3$, 33.4–34.0 wt. % $P_2O_5$ and the balance water. In addition, since the material of Example 2 did not contain $Al(OH)_3$—$H_3PO_4$ mixture used in Example 1, it did not require the ice bath used in Example 1 to prevent premature reaction. When the stack containing MAP mixture was heated above 150° C., the bloating of the matrix was not observed. Two samples were tested as in Example 1 and the average of the two samples of Example 2 was determined recorded on Table 1. The substitution of materials in Example 2 resulted in an improved high temperature strength.

EXAMPLE 3

The procedure outlined in Example 1 was repeated in Example 3 except that slurry was prepared by blending 60.5 wt. % A16-SG alumina which is commercially available from Alcoa (Aluminum Company of America), 4.9 wt. % aluminum trihydrate (Alcoa Hydral 710B), 2.7 wt. % chromic acid ($CrO_3$), 18.4 wt. % phosphoric acid (85 wt. % $HPO_3$—15 wt. % $H_2O$) and 13.5 wt. % $H_2O$. When the stack containing the $Al(OH)_3$—$H_3PO_4$ mixture was heated above 150° C., bloating and voids in the matrix were observed. This bloating was attributed to the reaction which produces $Al(H_2PO_4)_3$ and the associated liberation of $H_2O$ vapor. Two samples were tested as in Example 1 and the average of the two samples of Example 3 was determined recorded on Table 1. The addition of chrome in Example 3 resulted in the formation of a chromium phosphate phase which enhanced the composite's high temperature stability.

EXAMPLE 4

The procedure outlined in Example 1 and modified in Example 2 was repeated in Example 4 except that slurry was prepared by blending 60.5 wt. % Alcoa A16-SG alumina, 2.7 wt. % chromic acid ($CrO_3$) and 23.3 wt. % MAP and 13.5 wt. % $H_2O$. In addition, since the material of Example 2 did not contain $Al(OH)_3$—$H_3PO_4$ mixture used in Example 1, it did not require the ice bath used in Example 1 to prevent premature reaction. When the stack containing MAP mixture was heated above 150° C., the bloating of the matrix was not observed. Two samples were tested as in Example 1 and the average of the two samples of Example 4 was determined recorded on Table 1. The addition of chrome in Example 4 resulted in the formation of a chromium phosphate phase which enhanced the composite's high temperature stability.

EXAMPLE 5

The procedure outlined in Example 1 and modified in Example 2 was repeated in Example 5 except that slurry was prepared by blending 33 wt. % Alcoa A16-SG alumina, and 23.3 wt. % MAP and 13.5 wt. % $H_2O$. In addition, since the material of Example 5 did not contain $Al(OH)_3$—$H_3PO_4$ mixture used in Example 1, it did not require the ice bath used in Example 1 to prevent premature reaction. When the stack containing MAP mixture was heated above 150° C., the bloating of the matrix was not observed. Two samples were tested as in Example 1 and the average of the two samples of Example 5 was determined recorded on Table 1.

EXAMPLE 6

The procedure outlined in Example 1 was repeated in Example 6 except that a.) the 24 wt. % −325 mesh fused silica filler was replaced with 33 wt. % Alcoa A16-SG alumina and b.) the slurry was prepared using an acid aluminum-chromium III phosphate $(Al,Cr)(H_2PO_4)$ solution to produce the aluminum chromium phosphate bond phase. In addition, the procedure used in Example 6 did not require the use of an ice bath to prevent premature reaction since the slurry did not contain $Al(OH)_3$—$H_3PO$. The constitution of the solution is 30–31 wt. % $P_2O_5$, 7–8 wt. % $Al_2O_3$, 4–5 wt. % $Cr_2O_3$, and 44–59 wt. % $H_2O$. 32.7 wt. % alumina and 1.9 wt. % distilled $H_2O$ were added to 65.4 wt. % of the acid aluminum-chromium III phosphate solution. The mixture was blended in a Waring commercial blender for five minutes. Two samples were tested as in Example 1 and the average of the two samples of Example 6 was determined and recorded on Table 1. The addition of chrome in Example 6 resulted in the formation of a chromium phosphate phase which enhanced the composite's high temperature stability.

TABLE 1

| Example # | Type of Filler | % of Filler** | Strength at 1100° C. |
|---|---|---|---|
| 1 | silica | 35 | 5,200 psi |
| 2 | T-64 | 70 | 5,345 psi |
| 3* | A-16 | 60.5 | 6,084 psi |
| 4* | A-16 | 60.5 | 7,897 psi |
| 5 | A-16 | 50 | 11,336 psi |
| 6* | A-16 | 50 | 14,740 psi |

*Denotes the addition of chrome in the matrix.
**On a solids basis.

While the invention has been described in terms of Nicalon SiC fibers, the fibers contemplated for use in the present invention include all refractory fibers known in the art. Some common fibers which are contemplated for use in the present invention include: carbon, graphite, silicon nitride and oxides such as alumina and aluminum silicate (mullite). The fibers may be continuous or discontinuous, monofilament, untwisted or twisted multi-filament yarns or high bulk filament yarns. The fibers may also be randomly oriented, unidirectional or woven. The variety of fiber architecture used to reinforce the ceramic component may be any of those taught in "Preform Fiber Architecture for Ceramic Matrix Composites", Frank K. Ko, *Ceramic Bulletin*, Vol. 68, No. 2, page 401, February 1989, and the content of this article is incorporated herein by reference.

While the invention has not been described in terms of coatings for the fibers, coatings are contemplated for use in the present invention. Coatings include all those that are commonly use with refractory fibers. Some common fiber coatings contemplated for use in the present invention include: silicone, carbon, boron nitride, silicon carbide, titanium carbide, zirconium carbide, tungsten carbide, hafnium carbide, tantalum carbide, niobium carbide, zirconium carbide, titanium nitride and refractory metals such as tungsten, molybdenum and platinum.

In addition, it is contemplated that single coatings as well as duplex and triplex coatings may be used in practicing the present invention. The duplex and triplex coatings are formed by applying the above coating materials in successive layers. Duplex coatings that have been found useful in practicing the present invention include carbon/boron nitride coatings and carbon/silicon carbide. The fiber coatings may be any of those taught in "Fiber Coating and Characterization", David C. Cranmer, *Ceramic Bulletin*, Vol. 68, No. 2, page 415, February 1989, and the content of this article is incorporated herein by reference.

While the invention has been described in terms of alumina filler material, other filler materials are contemplated for use in the present invention. Other filler materials include all those that are commonly used with refractory fibers. Some common filler materials contemplated for use in the present invention include: silicon carbide whiskers. Other chrome containing materials such as chrome nitrate, chrome sulfate, chromic acetate and other chrome containing materials that are soluble in water can also be used in practicing the present invention.

It is contemplated that different amounts of filler material may be used in practicing the present invention. Thus for example, amounts other than 70–90 wt. % alumina may be used. One skilled in the art will appreciate that the higher the wt. % of the filler that is actually used the less porosity in the final cured part. This a result of the removal of water during curing. Although wt. %s as high as 90% may be used, the upper limit of the actual percent of filler is not critical to practicing the invention. At the lower limit of the percentage of filler material used in practicing the present invention, the strength of the matrix will be greatly reduced when the percentage of the filler material is below 25%.

While the invention has been described in terms of preferred embodiments, it is intended that all matter contained in the above description shall be interpreted as illustrative. The present invention is indicated by the broad general meaning of the terms in which the appended claims are expressed.

What is claimed is:

1. A method of forming fiber reinforced aluminum phosphate bonded refractory material, the method comprising the steps of:
   preparing a slurry by blending alumina having an average particle size of less than approximately 10 microns and aluminum phosphate solution, said slurry being substantially free of silica;
   infiltrating said slurry into a refractory fibrous substrate to form an infiltrated substrate; and
   curing without sintering said infiltrated substrate at a temperature of greater than approximately 200° C. to form a fiber reinforced aluminum phosphate bonded refractory material.

2. The method of claim 1 in which said step of preparing a slurry includes:
   preparing a solution of from about 30 to about 70 wt. % monoaluminum phosphate solution and from about 30 to about 70 wt. % $H_2O$;
   blending from approximately 10–70 wt. % alumina into said slurry.

3. The method of claim 1 in which said step of providing a slurry includes:
   providing fiber selected from the group consisting of SiC fibers, TiC fibers, aluminum borosilicate fibers, alumina fibers, carbon fibers, and graphite fibers.

4. The method of claim 1 in which said step of infiltrating said slurry, includes:
   infiltrating said slurry into a panel of woven fibers.

5. The method of claim 1 in which said step of infiltrating said slurry, includes:
   infiltrating said slurry into a fibrous preform.

6. The method of claim 1 in which said step of infiltrating said slurry includes:
   infiltrating said slurry into a fibrous substrate formed of fibers selected from the group consisting of SiC fibers, TiC fibers, aluminum borosilicate fibers, alumina fibers, carbon fibers and graphite fibers.

7. The method of claim 1 wherein said alumina has a high surface area.

8. The method of claim 1 in which said step of preparing a slurry includes:
   preparing a slurry by blending alumina and an aluminum phosphate solution containing 4–10 wt. % chrome.

9. The method of claim 1, in which said step of curing said infiltrated substrate, includes:
   heating said infiltrated substrate to a temperature of less than approximately 400 degrees centigrade.

10. The method of claim 1 in which said step of curing said infiltrated substrate includes:
    heating said infiltrated substrate to a temperature of less than approximately 400 degrees centigrade at a pressure of up to approximately 200 pounds per square inch.

11. The method of claim 1 in which said step of curing said infiltrated substrate includes:
    heating said infiltrated substrate to a temperature of less than approximately 400 degrees centigrade at a pressure of up to approximately 200 pounds per square inch for approximately 4 hours.

12. The method of claim 1 in which said step of curing said green matrix includes:
    heating said fiber reinforced aluminum phosphate bonded refractory material in air at a temperature less than approximately 400 degrees centigrade for one hour.

13. A method of forming fiber reinforced aluminum phosphate bonded refractory material having a high fracture resistance at temperatures in excess of 1200° C., the method comprising the steps of:
    providing refractory fiber;
    providing a solution of from about 30 to about 70 wt. % monoaluminum phosphate solution and from about 30 to about 70 wt. % $H_2O$;
    preparing a slurry by blending approximately 10–70 wt. % alumina having an average particle size of less than approximately 10 microns and said aluminum phosphate solution, said slurry being substantially free of silica;
    impregnating said refractory fiber with said slurry to form a green matrix;
    at least partially drying said impregnated refractory fiber to remove some of the excess free water from said green matrix; and
    curing, without sintering said green matrix at a temperature of greater than approximately 200° C. to form said fiber reinforced aluminum phosphate bonded refractory material.

14. The method of claim 13 in which said step of providing refractory fiber includes:
    providing said fiber in a preform.

15. The method of claim 13 in which said step of providing refractory fiber includes:
    providing said fibers in a woven fabric.

16. The method of claim 15 in which said step of impregnating said fiber includes:
    pouring said slurry onto said fabric and mechanically forcing it into said fibers.

17. The method of claim 13 in which said step of impregnating said fiber includes:
    vacuum infiltrating said slurry into said fibers.

18. A fiber reinforced aluminum phosphate bonded refractory material comprising:
    a matrix formed from a slurry prepared by:
       blending approximately 10–70 wt. % alumina having an average particle size of less than approximately 10 microns and aluminum phosphate solution of from about 30 to about 70 wt. % monoaluminum phosphate solution and from about 30 to about 70 wt. % $H_2O$, said slurry being substantially free of silica; and
    refractory fiber.

19. The fiber reinforced aluminum phosphate bonded refractory material of claim 18, in which said fiber is selected from the group consisting of SiC fibers, TiC fibers, aluminum borosilicate fibers, alumina fibers, and graphite fibers.

20. The fiber reinforced aluminum phosphate bonded refractory material in claim 18 in which said matrix contains from about 10 to about 75 vol. % fibers.

21. The fiber reinforced aluminum phosphate bonded refractory material of claim 18, in which said fiber is a woven preform.

22. The fiber reinforced aluminum phosphate bonded refractory material of claim 18, in which said fiber is unidirectional.

23. The fiber reinforced aluminum phosphate bonded refractory material of claim 18, in which said fiber is randomly oriented.

24. The fiber reinforced aluminum phosphate bonded refractory material of claim 18, in which said slurry contains alumina having an average particle size of less than approximately 2 microns.

25. The fiber reinforced aluminum phosphate bonded refractory material of claim 18, in which alumina is from about 25 to about 90 wt. % of said matrix material.

26. The fiber reinforced aluminum phosphate bonded refractory material of claim 18, in which said refractory material is formed by:

impregnating said refractory fiber with said slurry;

drying said impregnated refractory fiber to form a green matrix; and curing, without sintering said green matrix at a temperature greater than approximately 200° C. to form said fiber reinforced aluminum phosphate bonded refractory material.

27. The fiber reinforced aluminum phosphate bonded refractory material of claim 18, in which said aluminum phosphate solution contains from about 4 to about 10 wt. % chrome.

28. A fiber reinforced aluminum phosphate bonded refractory material comprising:

refractory fiber; and a matrix formed from a slurry prepared by blending alumina and aluminum phosphate solution, said slurry being substantially free of silica;

impregnating said refractory fiber with said slurry;

drying said impregnated refractory fiber to form a green matrix; and curing, without sintering said green matrix to form said fiber reinforced aluminum phosphate bonded refractory material.

29. The fiber reinforced aluminum phosphate bonded refractory material of claim 28 wherein said fiber has a coating.

30. The fiber reinforced aluminum phosphate bonded refractory material of claim 28 in which the wt. % of silica is less than about 1 percent.

31. A refractory moldable composition consisting of:

from about 30 to about 70 wt. % monoaluminum phosphate solution;

from about 30 to about 70 wt. % $H_2O$; and from about 10 to about 40 wt. % alumina having particle size of less than 10 microns; and a refractory fiber.

32. The refractory moldable composition of claim 31 wherein the refractory fiber is selected from the group consisting of SiC fibers, TiC fibers, aluminum borosilicate fibers, alumina fibers, carbon fibers, and graphite fibers in an amount of 10–75 vol. %.

33. The method of claim 1 in which said step of preparing a slurry includes:

preparing a solution of from about 30 to about 70 wt. % monoaluminum phosphate solution and from about 30 to about 70 wt. % $H_2O$;

blending from approximately 50–70 wt. % alumina into said slurry.

34. The method of claim 1 in which said step of preparing a slurry includes:

preparing a solution of from about 30 to about 70 wt. % monoaluminum phosphate solution and from about 30 to about 70 wt. % $H_2O$; and blending from approximately 70–90 wt. % alumina into said slurry.

35. A fiber reinforced aluminum phosphate bonded refractory material comprising:

(a) a matrix material of:
20–90 wt % alumina having a particle size less than about 10 microns
0–1 wt % silica
10–80 wt % aluminum phosphate solution; and (b) refractory fiber.

* * * * *